(12) United States Patent
Lam

(10) Patent No.: US 8,627,409 B2
(45) Date of Patent: Jan. 7, 2014

(54) FRAMEWORK FOR AUTOMATED DISSEMINATION OF SECURITY METADATA FOR DISTRIBUTED TRUST ESTABLISHMENT

(75) Inventor: Peifung Eric Lam, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1425 days.

(21) Appl. No.: 11/748,639

(22) Filed: May 15, 2007

(65) Prior Publication Data

US 2008/0289019 A1 Nov. 20, 2008

(51) Int. Cl.
*H04L 29/00* (2006.01)

(52) U.S. Cl.
USPC .............. 726/3; 726/9; 713/152; 713/160

(58) Field of Classification Search
USPC ............................. 726/9; 713/152, 160
See application file for complete search history.

(56) References Cited

U.S. PATENT DOCUMENTS

| | | | | |
|---|---|---|---|---|
| 6,088,796 | A | * | 7/2000 | Cianfrocca et al. ........... 713/152 |
| 2005/0251533 | A1 | * | 11/2005 | Harken et al. ............. 707/104.1 |
| 2007/0079117 | A1 | * | 4/2007 | Bhogal et al. ................. 713/160 |
| 2007/0100701 | A1 | * | 5/2007 | Boccon-Gibod et al. ....... 705/21 |

OTHER PUBLICATIONS

Straub, Tobias, "Usability Challenges of PKI," Dissertation, Dec. 2005 (289 pages).

* cited by examiner

*Primary Examiner* — Brandon Hoffman
*Assistant Examiner* — Michael D Anderson
(74) *Attorney, Agent, or Firm* — Kilpatrick Townsend & Stockton LLP

(57) ABSTRACT

Methods, systems, and machine-readable media for disseminating security metadata from one distributed entity to another in an automated fashion are disclosed. According to one embodiment of the present invention, a computer-implemented method for distributing security metadata comprises receiving at a first service a request for security metadata, the request being received from a process associated with a second service. The method further comprises generating an identifier and security metadata for the second service, the identifier and the security metadata being unique to the second service, and storing the identifier and the security metadata in a first memory accessible to the first service. The identifier and the security metadata are then transmitted to the process associated with the second service and stored in a second memory. The second service is configured to access the security metadata stored in the second memory to encrypt a first communication and decrypt a second communication.

18 Claims, 7 Drawing Sheets

FRAMEWORK FOR AUTOMATED DISSEMINATION OF SECURITY METADATA FOR DISTRIBUTED TRUST ESTABLISHMENT

BACKGROUND OF THE INVENTION

Embodiments of the present invention relate generally to information distribution, and more particularly relate to systems and methods for disseminating security metadata.

In an enterprise deployment, distributed software applications typically rely on a centralized security service. These applications are known as "relying parties" because they "rely" on the security service to carry out various security functions. For example, a relying party may delegate responsibility for user authentication to a centralized Single Sign-On ("SSO") server. In this scenario, the SSO server authenticates a user and passes the user's authenticated identity securely to the relying party. The relying party then accepts the authenticated identity from the SSO server and grants application access to the user. Since relying parties can take advantage of centralized security functions, they do not need to implement their own security modules. This simplifies application administration and deployment.

Implementing a centralized security service requires two-way trust to be established between relying parties and the security service. In other words, the relying parties must trust that all communications received from the security service are genuine, and vice versa. As known in the art, one way to establish this trust is through the use of security metadata (e.g., passwords, cryptographic keys, etc.). For example, a relying party may encrypt a user authentication request using a symmetric key known only to the relying party and the security service, and send the encrypted request to the security service. Since the relying party is the only other party that knows the key, the security service can trust that the request is genuine. Similarly, the security service may encrypt a response (e.g., authenticated user identity) using the symmetric key, and transmit the encrypted response to the relying party. Since the security service is the only other party that knows the key, the relying party can trust that the response is genuine.

In current implementations, security metadata can be distributed to relying parties manually (i.e., through human intervention). For example, an administrator of a relying party may contact an administrator of the security service via phone, email, physical mail, or the like and request security metadata. The administrator of the security service may then provide the security metadata in a disk, USB flash drive, email, or the like. In another (semi) manual approach, the security service may operate a self-service administration page for disseminating security metadata. The administrator of the relying party may login to the page and request security metadata, which is presented via a user interface to the administrator. The administrator may then manually record the presented metadata and insert it into the relying party system.

While these manual approaches are functional, they are also problematic for several reasons. First, they may be time-consuming. It may take a long time, for instance, for the administrator of the security service to respond to an email request. Second, these approaches are not particularly secure. Security metadata that is exchanged on a disk or USB drive is prone to theft or loss, and metadata that is sent via email is prone to being intercepted or viewed by unintended third parties. Finally, manual distribution is error-prone. Security metadata is often complex and "cryptic." For instance, a 128-bit cryptographic key is represented as a string of 26 or more hexadecimal digits. As such, transferring this data manually can be difficult and result in transcription errors or other mistakes.

The dissemination of security metadata can be facilitated, to some extent, through public key infrastructure (PKI). In general, a PKI consists of client software, server software such as a certificate authority, hardware (e.g., smart cards) and operational procedures. PKI can be set up to provide for trusted third party vetting of, and vouching for, user identities. PKI arrangements enable computer users to be authenticated to each other, and to use the information in identity certificates (i.e., each other's public keys) to encrypt and decrypt messages traveling to and fro.

PKI is known for its complex deployment requirements and its usability issues are well documented. Some of the notable difficulties include certificate management, trust anchors management, and Information and Service Access control. Also, not all PKI operational procedures are fully automated in a typical deployment environment.

Thus, it is desirable to have a fully automated process for disseminating security metadata that overcomes the problems of manual distribution without incurring the complexities of a PKI deployment.

BRIEF SUMMARY OF THE INVENTION

Embodiments of the present invention address the foregoing and other such problems by providing a framework for automated dissemination of security metadata.

In one set of embodiments, a process transmits a request for security metadata on behalf of a relying party to a management endpoint of a security service. The requesting process may be a process of the relying party itself, or a separate, but associated process (e.g., installer process, registration process, etc.). The request is transmitted via a secure communications protocol, such as Secure Sockets Layer (SSL). When the request is received, a component of the security service authenticates the user that initiated the request (e.g., an administrator) and generates an identifier and security metadata unique to the relying party. This information is stored in a first memory location (e.g., flat file, database, etc.) accessible to the security service. The identifier and security metadata is then transmitted back via the same secure communications protocol (e.g., SSL) to the relying party, where the information is stored in a second memory location (e.g., flat file, database, etc.) accessible to the relying party. In this manner, security metadata is quickly and securely exchanged between a centralized security authority and a partner entity with minimal human intervention.

In further embodiments, a centralized management service or directory is employed to facilitate the interoperation of the security service and relying parties. For example, the management service may store the current network address of the security service management endpoint. Thus, relying parties may access the management service and dynamically discover the location of the management endpoint at the time of submitting a security metadata request, rather than storing the location locally. This feature is useful in at least two scenarios. First, if the network address of the security service changes, each individual relying party does not need to be updated with the new address. Second, if multiple security service instances are available, the management service can perform load balancing by directing relying parties to the security service instance with the lightest load.

The management service may also be used for other functions, such as storing the network addresses of security service access endpoints (used by relying parties at runtime to request security services), or storing the identifier/security metadata information for each relying party. These functions are further described in the detailed description.

According to one embodiment of the present invention, a computer-implemented method for distributing security metadata comprises receiving at a first service a request for security metadata, the request being received from a process associated with a second service. The method further comprises generating an identifier and security metadata for the second service, the identifier and the security metadata being unique to the second service, and storing the identifier and the security metadata in a first memory accessible to the first service. The identifier and the security metadata are then transmitted to the process associated with the second service and stored in a second memory. The second service is configured to access the security metadata stored in the second memory to encrypt a first communication and decrypt a second communication.

According to another embodiment of the present invention, the first service is resident on a first server and the process associated with the second service is resident on a second server. The process is configured to determine the location of the first service by querying a management service resident on a third server, where the first service is registered with the management service.

According to yet another embodiment of the present invention, a system for distributing security metadata comprises a first data storage device operable to store a plurality of security metadata and a first server in communication with the first data storage device, the first server executing an instance of a first service. The first service is configured to receive a request for security metadata from a process associated with a second service. The first service is further configured to generate an identifier and security metadata for the second service, the identifier and the security metadata being unique to the second service, and store the identifier and the security metadata in the first data storage device. The identifier and the security metadata are then transmitted to the process associated with the second service and stored in memory. The second service is configured to access the security metadata stored in the memory to encrypt a first communication and decrypt a second communication.

According to yet another aspect of the present invention, a machine-readable medium for a computer system is disclosed. The machine-readable medium includes instructions which, when executed by a processor, cause the processor to receive a request for security metadata, the request being received from a process associated with an application service. Various embodiments also include instructions that cause the processor to generate an identifier and security metadata for the application service, the identifier and the security metadata being unique to the application service; and store the identifier and the security metadata in a first memory accessible to the computer system. Further instructions cause the processor to transmit the identifier and the security metadata to the process associated with the application service, the process being configured to store the identifier and the security metadata in a second memory. The application service is configured to access the security metadata stored in the second memory to encrypt a first communication and decrypt a second communication.

A further understanding of the nature and the advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention relate to methods, systems, and machine-readable media for disseminating security metadata from one distributed entity to another in an automated fashion. Specific embodiments are directed (but not limited) to the enterprise software context, where security metadata must be exchanged between a centralized security service and a number of different relying parties. Current methods of manual security metadata distribution are problematic because they can be time-consuming, insecure, and error-prone. Embodiments of the present invention overcome these problems and thus facilitate the deployment and maintenance of distributed entities (e.g., relying parties) that rely on centralized security.

Figure 1:
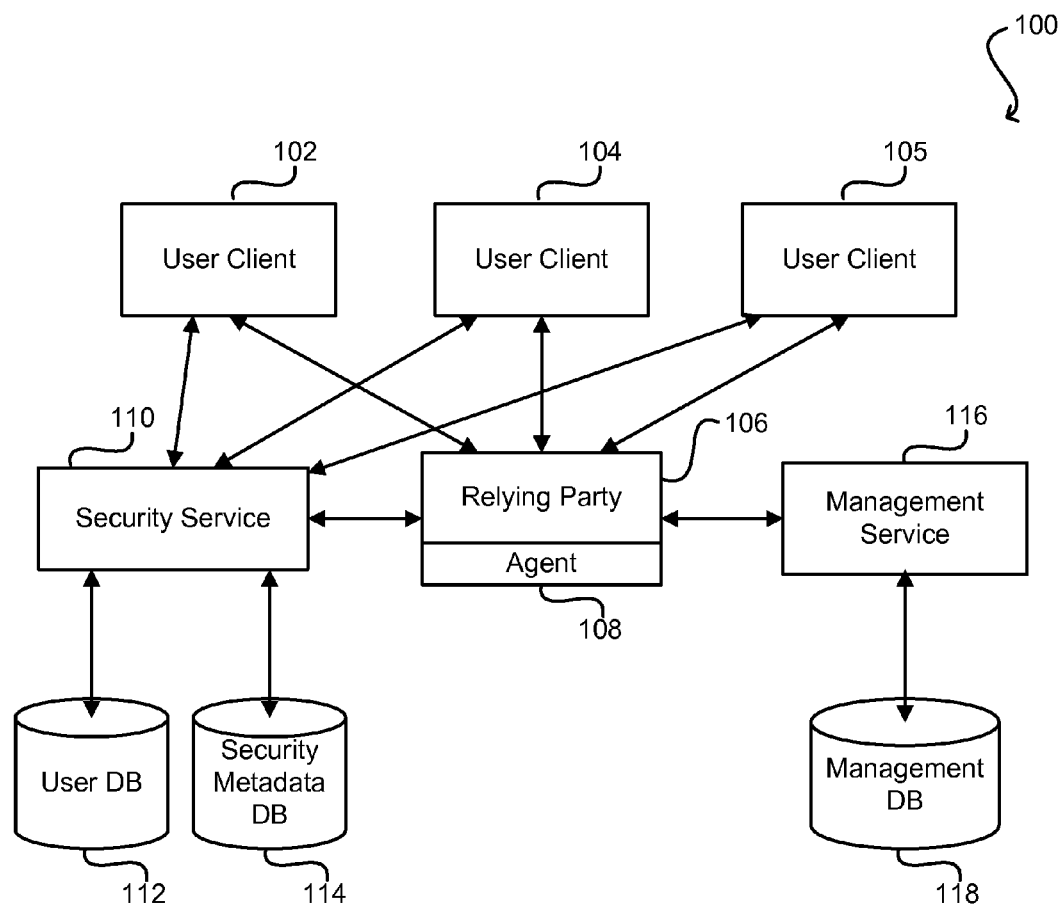
FIG. 1 illustrates an exemplary environment for running a relying party.
Figure 2A:
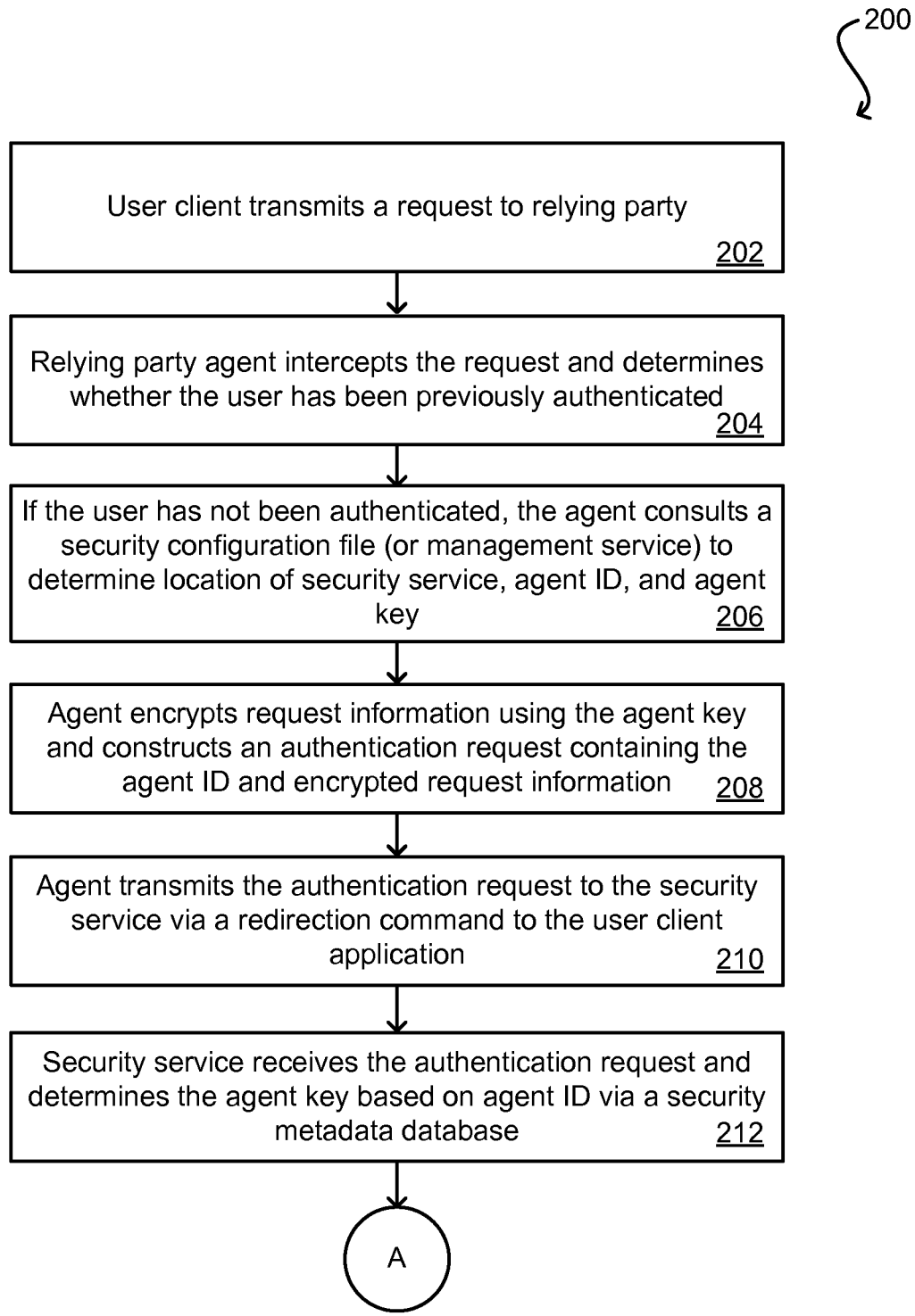
FIGS. 2A and 2B illustrate the steps performed in authenticating a user of a relying party at runtime.
Figure 2B:
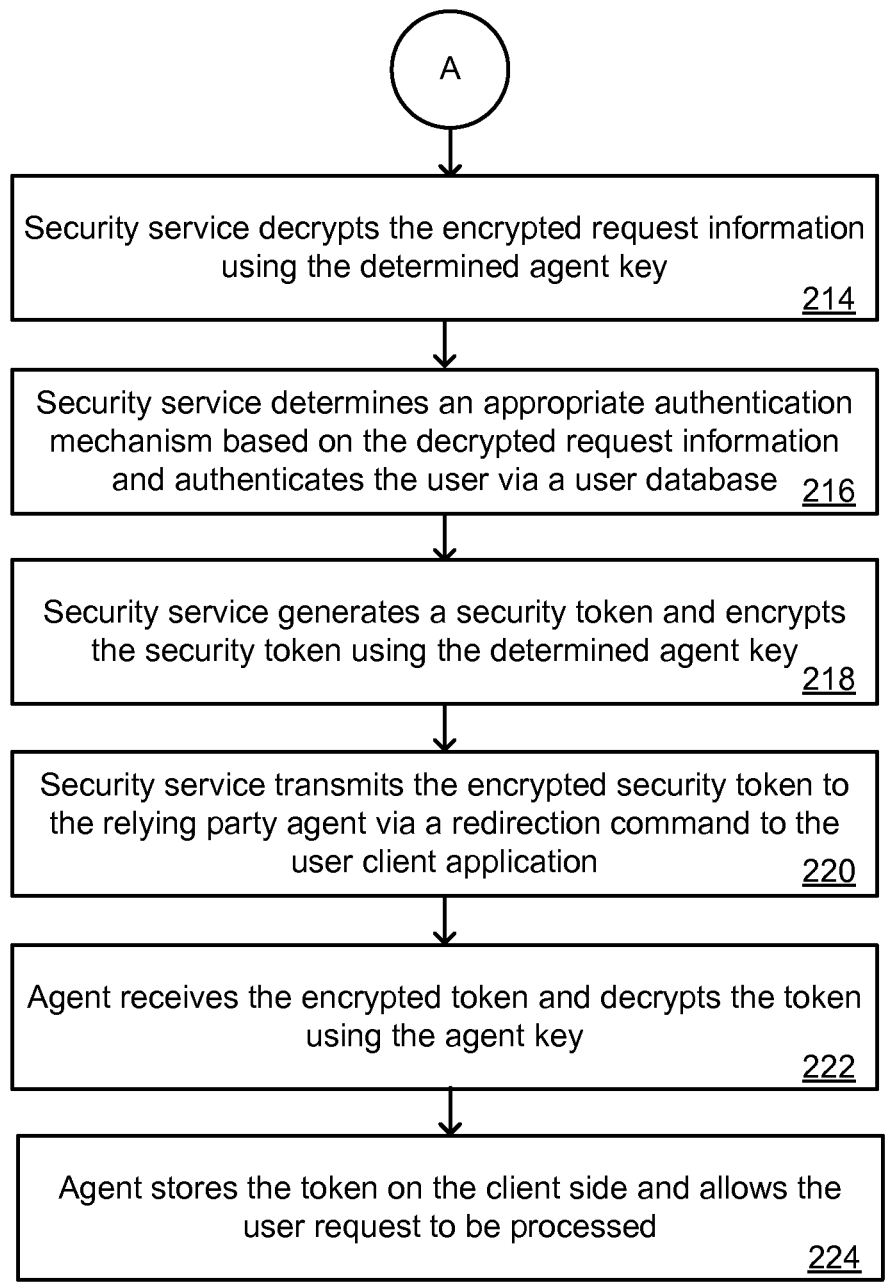

FIG. 1 illustrates an exemplary runtime environment of a relying party in an enterprise deployment. This figure, in conjunction with FIGS. 2A and 2B, is presented to provide an overview on how a relying party typically invokes a centralized security service to satisfy a user request. As shown, runtime environment 100 includes user clients 102, 104, 105, which send user requests to relying party 106. These user requests may include, for example, a login request, or a request to perform a specific application function (e.g., data view, data insert, data delete, etc.). Although only three user clients are shown, one of ordinary skill in the art would appreciate that any number of user clients may be in communication with relying party 106 at a time.

User clients 102, 104, 105 are also communicatively connected to security service 110. Security service 110 is configured to perform one or more security-related functions on behalf of relying party 106. Such functions may include user authentication, user authorization, or a more generic "claims" function where security service 110 can vouch for any assertion (i.e., logical statement). For example, security service 110 can vouch that a user's driver license number is XXXXX, the user is 21 years or older, the user has a credit limit sufficient to pay for a particular transaction, the user is authorized to carry out a particular action, and the like. Logically, a "claims" function can subsume an authentication function, which asserts a user's identity, and an authorization function, which asserts that a user is allowed/disallowed to carry out a particular action.

To execute these security functions, security service 110 consults with a user database 112 and a security metadata database 114. As will be described in further detail below, security metadata database 114 contains the security metadata that is generated for (and distributed to) each relying party. Databases 112 and 114 may each be implemented as a single data repository or a collection of data repositories, and may reside on storage that is local or remote to security service 110.

Relying party 106 coordinates interoperation with security service 110 through relying party agent 108. Agent 108 may be implemented as an internal process or thread of relying party 106, or as an external process. In various embodiments, agent 108 is configured to intercept user requests that require security services, and to redirect those requests to security service 110. Agent 108 is also configured to receive any data (e.g., security tokens) received from security service 110 and process that data to allow or disallow a user request.

Environment 100 also includes a centralized management service 116 and a management database 118. At runtime, relying party 106 (or agent 108) interacts with management service 116 to discover data that is needed to interoperate with security service 110. For example, management service 116 may have access to the network location of the access endpoint (e.g., security service URL) of security service 110. In certain embodiments, management service 116 may also store the identifier and security metadata for relying party 116. Thus, relying party 106 would need to retrieve this data before requesting security functionality from security service 110. In various embodiments, all of the above management data would be stored in management database 118. Management database 118 may be implemented as a single data repository or a collection of data repositories, and may reside on storage that is local or remote to management service 116.

FIGS. 2A and 2B illustrate the steps performed in authenticating a user of a relying party at runtime. Although user authentication is shown, it should be apparent that relying party 106 may interact with security service 110 to request any type of security-related function, including but not limited to authentication, authorization, and claims functions. One of ordinary skill in the art would recognize other variations, modifications, and alternatives. At step 202, user client 102, 104, or 105 transmits a request to relying party 106. As described above, the request may be, for instance, a login request. At step 204, agent 108 intercepts the user request and determines whether the user has been previously authenticated. In one set of embodiments, this determination is performed by checking for a security "cookie" on the user client's computer. In this case, the cookie would exist if the user client had been previously authenticated by security service 110.

If the security cookie doesn't exist (or has expired), a security configuration file is consulted to determine the network location of security service 110, as well as the identifier and security metadata for relying party 106 (206). In various embodiments, this security configuration file is created when security metadata is initially disseminated from security service 110 to relying party 106 (described further below). In an exemplary embodiment, the configuration file contains the relying party (or agent) identifier, the security metadata for the application, and a network address (e.g., URL) of the access endpoint of security service 110.

In alternative embodiments, the configuration file contains a "topology node ID" in addition to (or in lieu of) the hard-coded access endpoint address. The topology node ID is used as a reference to a data entry in management service 116 which stores the current access endpoint address. Thus, the topology node ID is used by application 106 in certain embodiments to dynamically discover the location of security service 110 at runtime. If topology node ID is used, the hard-coded access endpoint address in the configuration file may be ignored by relying party 106. Alternatively, the hard-coded address may still be used if, for example, management service 116 is unavailable and cannot be queried.

Although the security configuration file is referred to as a "file," one of ordinary skill in the art would recognize that the information contained therein (e.g., identifier, security metadata, etc.) may be stored in any type of logical storage format (e.g., flat file, database entry, etc.). Furthermore, the configuration file may be stored in a location local or remote to relying party 106. In one set of embodiments, the configuration file may be stored with management service 116. This would allow, inter alia, multiple instances of a relying party to share a single identifier and security metadata.

At step 208, agent 108 secures (e.g., encrypts) information from the user request (e.g., time of request, resource requested by the user, etc.) using the security metadata retrieved from the configuration file. The security metadata may be, for instance, a symmetric or asymmetric cryptographic key. Many other types of security metadata (such as passwords, etc.) are contemplated and may be used in conjunction with the present invention. The agent then constructs an authentication request. In various embodiments, the authentication request comprises the identifier of relying party 106 (retrieved from the configuration file), concatenated with the encrypted request information described above.

The authentication request is subsequently transmitted to security service 110 (210). In an embodiment, the request is transmitted directly between relying party 106 and security service 110. Alternatively, the request may be sent to the user client's application (e.g., web browser, document processor, etc.), with a command to redirect the client application to security service 110.

When the authentication request has been received at security service 110, the application identifier is extracted from the request and the identifier is used to determine the corresponding security metadata from security metadata database 114 (212). The determined security metadata is then used to decrypt the encrypted portion of the request. (214). In various embodiments, security service 110 may determine an appropriate authentication mechanism (e.g., username/password, PKI certificate, Kerberos token, Security Assertion Markup Language ("SAML") token, etc.) based on the information in the encrypted request. Once the mechanism is determined, the security credentials of the user are collected and verified against user database 112 (216).

If the verification is successful, security service 110 generates a security token signifying the authenticity of the user (218). This token is encrypted using the security metadata corresponding to relying party 106 and transmitted to agent 108 (220). As before, this transmission may be sent directly to relying party 106 or through a redirection of the user client's application.

At step 222, agent 108 receives the encrypted token and decrypts the token using the security metadata of relying party 106. An indication of the token is then stored on the user client side (e.g., in the form of a security cookie) and the user request is allowed (224).

Figure 3:
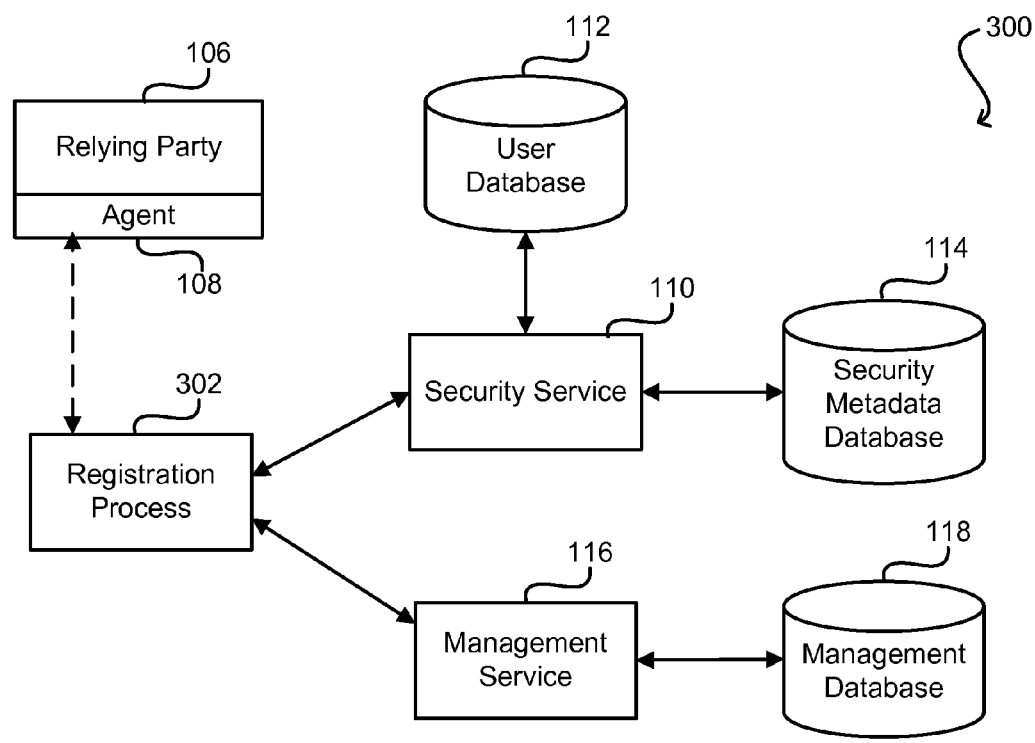
FIG. 3 illustrates an exemplary environment for registering a relying party in accordance with one embodiment of the present invention.

FIG. 3 illustrates an exemplary environment for registering a relying party in accordance with one embodiment of the present invention. As described herein, "registration" refers to configuring a relying party to interoperate with a centralized security service (e.g., 110). Accordingly, a "registration process" (e.g., 302 of FIG. 3) is a process that requests security metadata for a relying party (e.g., 116). Registration may occur at the time a relying party is installed; in this case, the registration may be performed by the relying party's installer process. Alternatively, registration may occur after the relying party has been installed, but before the relying party application has been brought online. Referring to FIG. 3, registration process 302 may be a process that is separate from its associated relying party 106, or may be an integral part of party 106.

As shown in FIG. 3, registration process 302 is communicatively coupled to security service 110 and management service 116. As will be described in greater detail with respect to FIG. 4, registration process 302 interacts with these services to request security metadata on behalf of relying party 106. Registration environment 300 also includes user database 112, security metadata database 114, and management database 118. These components are identical to those displayed in the runtime environment of FIG. 1.

Figure 4:
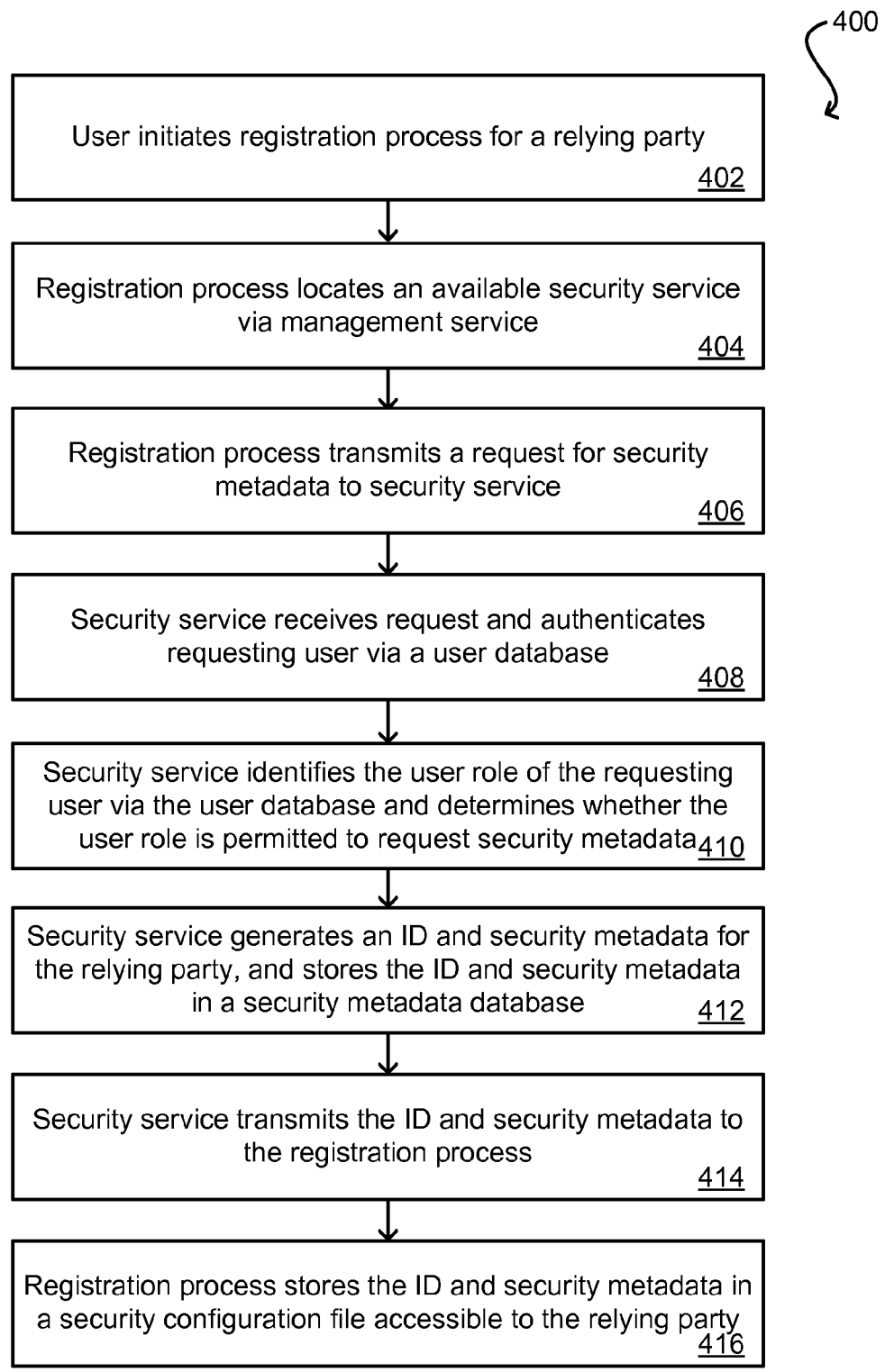
FIG. 4 illustrates the steps performed in processing a request for security metadata in accordance with one embodiment of the present invention.

FIG. 4 illustrates the steps performed in processing a request for security metadata in accordance with one embodiment of the present invention. At step 402, a user initiates registration process 302 to request metadata for relying party 106. This user would typically be an administrator of relying party 106. In an alternative embodiment, registration process 302 may be triggered through a parent process (e.g., installer process of relying party 106) or some other automated mechanism (e.g., programmatic workflow rule, etc.). In this case, the requesting "user" may be the initiator of the parent process, or a generic user account associated with automated infrastructure operations.

As described above, security service 110 may be registered with management service 116. In this case, registration process 302 may consult management service 116 to dynamically discover the network address of the security service's management endpoint (404). This allows a single, up-to-date copy of this location information to be maintained across the entire deployment. This also allows management service 116 to load-balance security metadata requests across multiple security service instances. Alternatively, each relying party (or associated registration process) may maintain the network address of the security service's management endpoint in local storage, and consult that locally-stored information to transmit a security metadata request.

At step 406, registration process 302 transmits a request for security metadata on behalf of relying party 106 to security service 110. The request may include (but is not limited to) the network address (e.g., URL) of agent 108, a human-readable name of agent 108 or application 106, and the requesting user's security credentials (e.g., username/password). In a exemplary embodiment, the request is sent via a secure communications protocol, such as Secure Sockets Layer (SSL). This is to ensure that the content of the request is not modified during transmission. Additionally, the request is encoded in a higher-level management protocol, such as Java Management Extensions (JMX). Of course, any other type of protocol or combination of protocols may be used.

At step 408, the security service receives the request at its management endpoint and authenticates the provided user security credentials against user database 112. In various embodiments, the management endpoint is implemented as a JMX managed bean (MBean). The JMX MBean is further encapsulated within an Oracle Container for J2EE (OC4J) container. In alternative embodiments, other software or hardware implementations are contemplated. One of ordinary skill in the art would recognize many variations, modifications, and alternatives.

According to one set of embodiments, security service 110 uses the security credentials of the requesting user to determine a user role of the user (410). For example, this user role information may be stored in, and determined from, user database 112. Alternatively, this user role information may be included in the request sent from registration process 302. The user role may then be checked against a set of privileges assigned to the role to determine whether the requesting user has the appropriate privileges to request security metadata. In an exemplary embodiment, an "administrator" type role will typically possess the appropriate privileges to request security metadata. However, these privileges may be assigned to any role in the system.

Once the requesting user has been authenticated (and optionally authorized), the security service generates an identifier and security metadata unique to relying party 106 (412). In one embodiment, the security metadata is a symmetric cryptographic key, such as an AES key. In this case, the security metadata may be generated using any of the commonly known methods for generating cryptographic keys. However, one of ordinary skill in the art would recognize that the security metadata may be any type of information that is sufficient to establish trust between the relying party and the security service (e.g., a password). In various embodiments, the generated identifier and security metadata may be tied to a piece of data (e.g., name, URL, etc.) associated to relying party 106, or to a piece of data associated to agent 108. Since there is a one-to-one relationship between relying parties and agents, any identifier that uniquely identifies agent 108 also uniquely identifies relying party 106.

At step 412, the generated identifier and security metadata are stored in security metadata database 114. This allows security service 110 to determine the appropriate security metadata for a given relying party/agent at runtime. Other information sent in the security metadata request, such as agent URL, agent name, and the like may also be stored in database 114. This additional information may be useful if, for example, an administrator of security service 110 needs to view and modify the entries in the database.

Once the unique identifier and security metadata are generated and stored, they are transmitted to registration process 302 (414). In an exemplary embodiment, this response communication is secured and transmitted via the same protocols as the original security metadata request (e.g., SSL, JMX, etc.).

At step 416, the identifier and metadata are received at registration process 302 and stored as a configuration file (or any other type of logical storage format) in a storage location accessible to relying party 106. In one embodiment, the received information is stored locally on the same server as relying party 106. In other embodiments, the identifier and metadata are also stored with management service 116. This arrangement has several advantages. First, it allows for efficient version control, since a master version of security metadata for each relying party can be maintained and updated at the management service. If a system-wide change to, for example, the formatting of security metadata needs to be made, the revision can be performed at management service 116 and pushed to all relying parties. Second, this arrangement can be used as a backup mechanism, in case a copy of security metadata stored locally at a relying party becomes corrupted. Third, this arrangement allows for load-balancers that automatically balance user requests across multiple instances of a relying party. Since all instances of a given application should share the same security metadata, each instance can access a single, master copy of the metadata through management service 116 rather than maintaining separate, duplicate copies.

It should be appreciated that the specific steps illustrated in FIG. 4 provide a particular method of automatically disseminating security metadata according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Although the foregoing embodiments have been discussed with respect to distributed software applications, many other uses of the present invention are contemplated. For example, embodiments of the present invention may be used to distribute security metadata between load balancers, network switches, security appliances, and other software and/or hardware-based devices/services. One of ordinary skill in the art would recognize many other uses.

Figure 5:
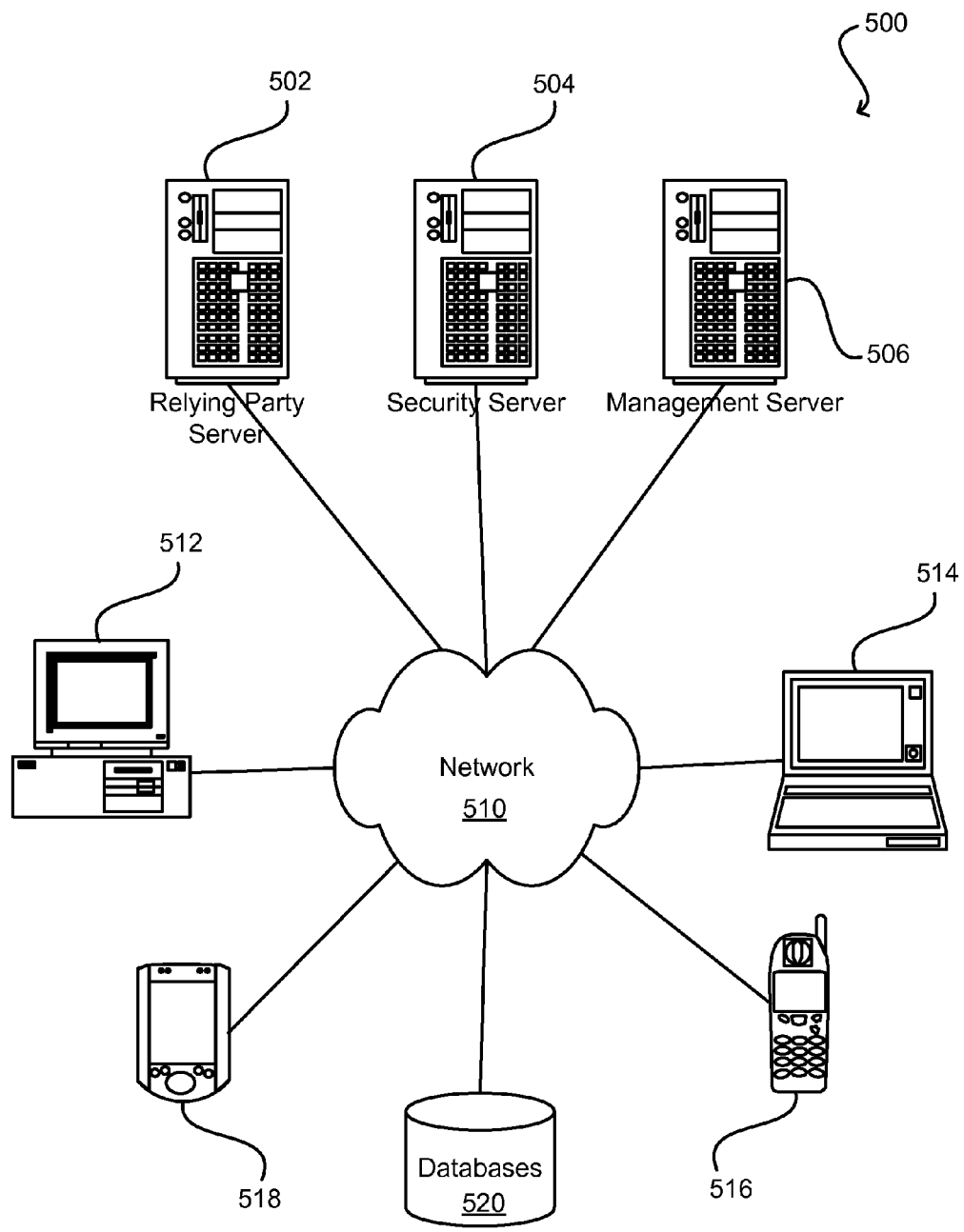
FIG. 5 illustrates components of an exemplary system environment that can be used in accordance with one embodiment of the present invention.

FIG. 5 is a block diagram illustrating components of an exemplary system environment in which various embodiments of the present invention may be implemented. The system 500 includes one or more user computers, computing devices, or processing devices 512, 514, 516, 518, which are used to operate a relying party client, such as a dedicated client (e.g., Oracle Forms), web browser, or the like. User computers 512, 514, 516, 518 may be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of software applications stored therein. Alternatively, user computers 512, 514, 516, 518 may be any other electronic device, such as a thin-client computer, Internet-enabled gaming system, and/or personal messaging device, capable of communicating via a network (e.g., network 510 described below) and/or displaying and navigating Web pages or other types of electronic documents. Although exemplary system environment 500 is shown with four user computers, any number of user computers may be supported.

In most embodiments, system environment 500 includes some type of network 510. Network 510 may be any type of network familiar to those skilled in the art that can support data communications using any of a variety of commercially-available protocols, including without limitation TCP/IP, SNA, IPX, AppleTalk, and the like. Merely by way of example, network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

System environment 500 also includes one or more server computers 502, 504, 506 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, one or more of the servers 502, 504, 506 are dedicated to running the relying parties, centralized security service, and centralized management service described in the foregoing disclosure. For example, as showing in FIG. 5, server 502 may act as an application server configured to execute relying party 106. Server 504 may act as a security server configured to execute security service 110. And server 506 may act as a management server configured to execute management service 116.

Each server 502, 504, 506 may run an operating system including any of those discussed above, as well as any commercially-available server operating systems. Servers 502, 504, 506 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 500 may also include one or more databases 520. For instance, databases 520 may include user database 112, security metadata database 114, and management database 118 as described in the foregoing disclosure. The databases 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via network 510) with one or more of these. In a particular set of embodiments, databases 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, databases 520 may be relational databases, such as Oracle 10g, that are adapted to store, update, and retrieve data in response to SQL-formatted commands.

Figure 6:
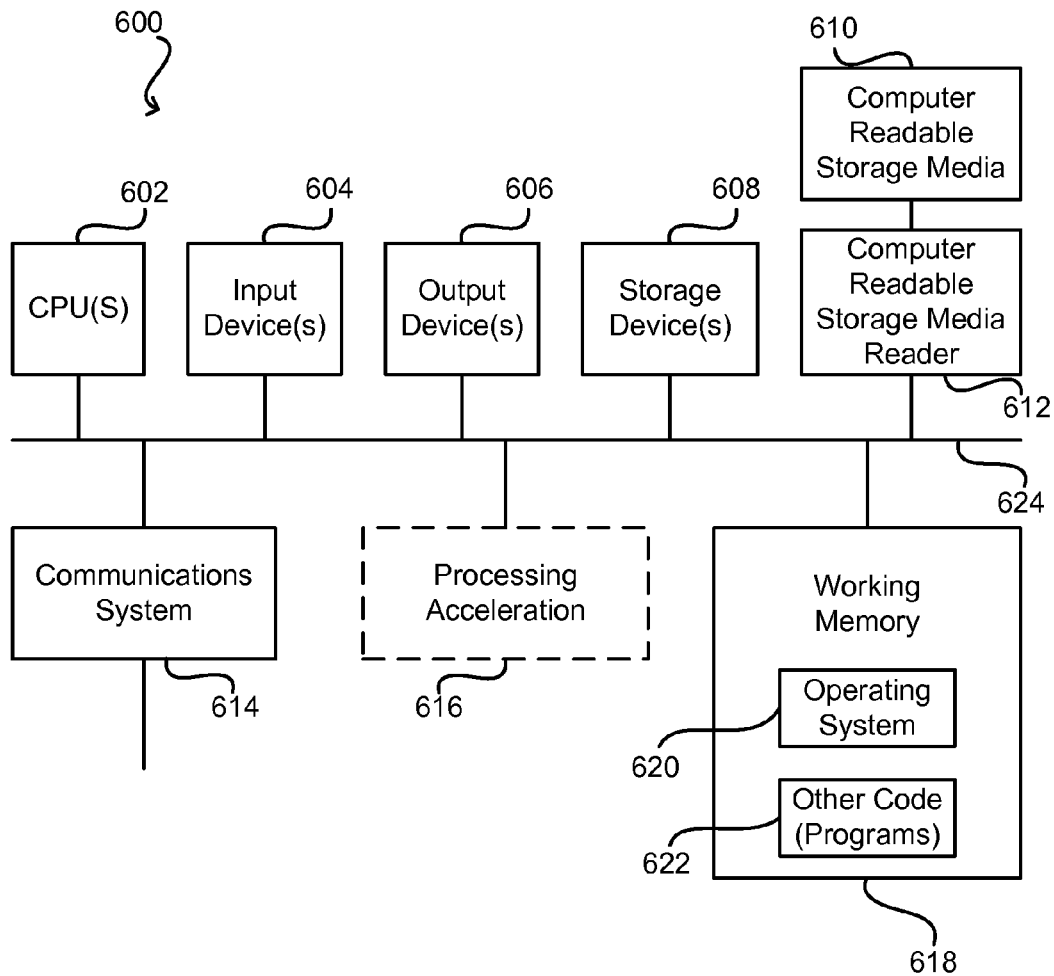
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 may include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system environment 500.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method for distributing security metadata, the method comprising:
   receiving at a first service a request to perform a security-related function and to provide security metadata, the request being received from a process associated with a second service, the security metadata comprising a security token;
   executing, by the first service, the security-related function on behalf of the second service, wherein the second service relies on the security metadata and results of execution of the security-related function by the first service to handle a user request to the second service;
   generating, by the first service, an identifier and the security metadata for the second service based on executing the security-related function, the identifier and the security metadata being unique to the second service;
   storing, by the first service, the identifier and the security metadata in a first memory accessible to the first service; and
   transmitting, by the first service, the identifier and the security metadata to the process associated with the second service, the process being configured to store the identifier and the security metadata in a second memory, the second service being configured to access the security metadata stored in the second memory to encrypt a first communication and decrypt a second communication.

2. The method of claim 1, wherein the security-related function is selected from a group consisting of: an authentication service, an authorization service, and a claims service.

3. The method of claim 1, wherein the request for security metadata further includes a location of the second service, a name of the second service, an identity of a requesting user, and a password of the requesting user.

4. The method of claim 3, further comprising:
   authenticating the identity of the requesting user, the authenticating comprising verifying the identity and the password against a user database; and
   determining whether a user role of the requesting user is authorized to submit the request.

5. The method of claim 1, wherein the first communication is a request to authenticate a potential user of the second service.

6. The method of claim 5, wherein the second communication is a security token authenticating the potential user of the second service.

7. The method of claim 1, wherein the first service is configured to access the security metadata stored in the first memory to decrypt the first communication and encrypt the second communication.

8. The method of claim 1, wherein the first service is resident on a first server, wherein the process associated with the second service is resident on a second server, and wherein the process is configured to determine the location of the first service by querying a management service resident on a third server, the first service being registered with the management service.

9. The method of claim 1, wherein the second service is resident on a first server, and wherein the second service is configured to access the security metadata stored in the second memory through a management service resident on a second server, the second memory comprising a data file stored in a location accessible to the second server.

10. The method of claim 1, wherein the second memory includes a network address of the first service.

11. The method of claim 1, wherein the second service and the second memory is resident on a first server,
   wherein the second memory includes a reference to a data entry, the data entry being stored on a second server,
   wherein the data entry includes a location of the first service, and
   wherein the second service is configured to retrieve the reference in the second memory and access the corresponding data entry stored on the second server, thereby determining the location of the first service.

12. The method of claim 1, wherein the steps of receiving a request for security metadata and transmitting the identifier and the security metadata are performed using a secure communications protocol.

13. The method of claim 12, wherein the secure communications protocol is Secure Sockets Layer (SSL).

14. The method of claim 1 wherein the security metadata includes a symmetric cryptographic key.

15. The method of claim 1 wherein the security metadata includes an asymmetric cryptographic key.

16. A system for distributing security metadata, comprising:
a first data storage device operable to store a plurality of security metadata; and
a first server in communication with the first data storage device, the first server executing an instance of a first service, the first service configured to:
receive a request to perform a security-related function and to provide security metadata, the request being received from a process associated with a second service, the security metadata comprising a security token;
execute the security-related function on behalf of the second service, wherein the second service relies on the security metadata and results of execution of the security-related function by the first service to handle a user request to the second service;
generate an identifier and security metadata for the second service based on executing the security-related function, the identifier and the security metadata being unique to the second service;
store the identifier and the security metadata in the first data storage device; and
transmit the identifier and the security metadata to the process associated with the second service, the process being configured to store the identifier and the security metadata in memory, the second service being configured to access the security metadata stored in the memory to encrypt a first communication and decrypt a second communication.

17. The system of claim 16, further comprising:
a second data storage device operable to store information about a plurality of services; and
a second server in communication with the second data storage device, the second server executing an instance of a management service, the management service configured to:
receive from the process associated with the second service a request for the location of the first service;
determine the location of the first service by accessing the second data storage device; the first service having been previously registered with the management service; and
transmit the location of the first service to the process.

18. A non-transitory machine-readable medium for a computer system, the non-transitory machine-readable medium having stored thereon a series of instructions which, when executed by a processor, cause the processor to distribute security metadata by:
receiving at the computer system a request to perform a security-related function and to provide security metadata, the request being received from a process associated with an application service, the security metadata comprising a security token;
executing the security-related function on behalf of the second service, wherein the second service relies on the security metadata and results of execution of the security-related function by the first service to handle a user request to the second service;
generating an identifier and security metadata for the application service based on executing the security-related function, the identifier and the security metadata being unique to the application service;
storing the identifier and the security metadata in a first memory accessible to the computer system; and
transmitting the identifier and the security metadata to the process associated with the application service, the process being configured to store the identifier and the security metadata in a second memory, the second service being configured to access the security metadata stored in the second memory to encrypt a first communication and decrypt a second communication.

* * * * *